United States Patent
Jourdain et al.

(10) Patent No.: US 8,661,261 B2
(45) Date of Patent: Feb. 25, 2014

(54) METHOD OF CONTROLLING ACCESS TO A CONTACTLESS INTERFACE IN AN INTEGRATED CIRCUIT WITH TWO COMMUNICATION INTERFACES WITH CONTACT AND CONTACTLESS

(75) Inventors: Joris Michel Jourdain, Aix en Provence (FR); Rémi Louis Marie Duclos, La Ciotat (FR); Jean-Philippe Vallieres, Aix en Provence (FR)

(73) Assignee: Inside Secure, Aix-en-Provence, Cedex (FR)

( * ) Notice: Subject to any disclaimer, the term of this patent is extended or adjusted under 35 U.S.C. 154(b) by 530 days.

(21) Appl. No.: 12/957,485

(22) Filed: Dec. 1, 2010

(65) Prior Publication Data

US 2011/0138186 A1    Jun. 9, 2011

(30) Foreign Application Priority Data

Dec. 1, 2009   (FR) ...................................... 09 05785

(51) Int. Cl.
*H04L 29/06*    (2006.01)
(52) U.S. Cl.
USPC ........................................................ 713/182
(58) Field of Classification Search
USPC ........................................................ 713/182
See application file for complete search history.

(56) References Cited

U.S. PATENT DOCUMENTS

| | | | |
|---|---|---|---|
| 8,296,560 B2 * | 10/2012 | Dommety et al. | 713/153 |
| 2004/0250037 A1 | 12/2004 | Takemura et al. | |
| 2009/0184799 A1 | 7/2009 | Ishibashi | |
| 2009/0247125 A1 * | 10/2009 | Grant | 455/411 |
| 2009/0254970 A1 * | 10/2009 | Agarwal et al. | 726/1 |
| 2010/0017881 A1 | 1/2010 | Goyet | |
| 2010/0049688 A1 * | 2/2010 | Matsumura | 706/52 |

FOREIGN PATENT DOCUMENTS

| | | |
|---|---|---|
| EP | 1467312 A1 | 10/2004 |
| FR | 2910666 A1 | 6/2008 |
| JP | 2007265200 A | 10/2007 |
| WO | 2008013066 A1 | 1/2008 |
| WO | 2009074173 A1 | 6/2009 |

OTHER PUBLICATIONS

FR Search Report and Opinion issued on Sep. 6, 2010 in FR Application No. FR 0905785.

* cited by examiner

*Primary Examiner* — Lisa Lewis
(74) *Attorney, Agent, or Firm* — Panitch Schwarze Belisario & Nadel LLP

(57) ABSTRACT

A method of access control to a communication interface of an integrated circuit, includes intercepting an event transmitted between a communication interface and an application performed by the integrated circuit, and transmitting the intercepted event if a specific parameter of the application indicates that the application is authorized to use the communication interface.

24 Claims, 4 Drawing Sheets

METHOD OF CONTROLLING ACCESS TO A CONTACTLESS INTERFACE IN AN INTEGRATED CIRCUIT WITH TWO COMMUNICATION INTERFACES WITH CONTACT AND CONTACTLESS

BACKGROUND OF THE INVENTION

Embodiments of the present invention relate to a method of controlling a contactless communication interface in an integrated circuit that may also include a contact communication interface. Embodiments of the present invention notably, but not exclusively relate to integrated circuits for chip cards, and in particular to integrated circuits for bankcards.

A bankcard issued by a bank may be sent to the card holder in an envelope by way of a postal carrier. If the card is equipped with a contactless communication interface, a terminal may communicate with the card through the envelope by a contactless communication link. An ill-intentioned person may therefore, without the knowledge of the card holder, perform a transaction with the card. During such a transaction, the card may be offline or online; that is to say linked to a network such as a banking network, by the intermediary of the terminal to which it is connected. If the transaction is performed online, the card may in particular request an authorization from a transaction server with identity verification of the card holder by the entry of a Personal Identification Number (PIN) code. The conduction of a transaction may change the initial state of an application installed in the integrated circuit of the card. Indeed, whether or not the transaction is authorized, a transaction counter may have been modified, with the result that the card is no longer in an initial state. An ill-intentioned person may also recuperate and possibly modify information stored in the integrated circuit, such as identification information of the card holder, an expiration date, a card number (Personal Account Number PAN), and authentication certificates of the card.

Certain applications, in particular payment applications, are configured to detect whether the card has already performed a first transaction. If a transaction performed with the card is the first transaction performed by the card, the application requires that the transaction be done online in order to be authorized beforehand by a transaction server. If the transaction is authorized by the transaction server, the application then authorizes the card to perform transactions offline. This functionality, called "New Card", prevents a successful performance of transactions as long as the card has not been activated online. However, this functionality does not prevent the performance of a first transaction online, even if it fails, nor the performance of a transaction offline if no identity verification of the card holder is requested or if only a visual verification of a signature by an authorized person is required. The "New Card" functionality therefore only offers a partial security, and requires that the holder perform a first transaction online. This functionality thus does not allow for the issuance of cards that can be immediately used with offline terminals. Moreover, certain types of card are incompatible with this functionality. Additionally, this functionality does not prevent the recover and, failing that, the modification of information stored by the card.

Thus, the presence of a contactless interface in an integrated circuit card raises various problems relating to the protection of privacy (mail interference), to the protection of identification data stored by the card against identity theft and their commercial use, to the protection of card transactions data, and to the protection of the card against fraudulent use (online or offline). If the card has the "New Card" functionality, this requires the user to connect, the first time, the card to an online terminal. If the card has a payment application and a counter incremented at each transaction no matter whether it is accepted or refused, the card holder may receive a used card. If the transaction server detects several unsuccessful transaction attempts with a card, this may cause the issuance of a notification to the card holder, and a possible blocking of the card, before the holder has even received the card. Consequently, the presence of a contactless interface in an integrated circuit card may cause the users to have negative opinions thereof.

It is therefore desirable to reinforce the security of integrated circuit cards having a contactless interface, without limiting the possible applications, nor complicating their use.

BRIEF SUMMARY OF THE INVENTION

One embodiment relates to a method of access control to a communication interface of an integrated circuit, including a step of intercepting an event transmitted between a communication interface and an application performed by the integrated circuit. According to one embodiment, the method includes a step of transmitting the intercepted event if a specific parameter of the application indicates that the application is authorized to use the communication interface.

According to one embodiment, the method includes a step of authorizing the application to use the communication interface if a condition is fulfilled by events transmitted for the application by another communication interface of the integrated circuit.

According to one embodiment, the communication interface is of a contactless type.

According to one embodiment, the method includes a step of authorizing the application to use the communication interface if a condition is fulfilled by events transmitted for another application performed by the integrated circuit, the other application itself able to be subjected to an authorization step to use the communication interface if a condition has been fulfilled by events transmitted for the application by the other communication interface of the integrated circuit.

According to one embodiment, the events for the other application are transmitted by the communication interface.

According to one embodiment, the method includes steps of verifying that a condition is fulfilled by the intercepted event if the specific parameter of the application indicates that the application is not authorized to use the communication interface, and if the condition is fulfilled, transmitting the intercepted event and modifying the specific parameter of the application so that it indicates that the application is authorized to use the communication interface.

According to one embodiment, the modification of the specific parameter of the application so that it indicates that the application is authorized to use the communication interface is only done if it is authorized by another specific parameter of the application.

According to one embodiment, the method includes steps of verifying that a condition is fulfilled by the intercepted event if the specific parameter of the application indicates that the application is authorized to use the communication interface, and if the condition is fulfilled, the intercepted event is not transmitted and the specific parameter of the application is modified so that it indicates that the application is no longer authorized to use the communication interface.

According to one embodiment, the method includes steps of storing a parameter specifying whether the access control to the communication interface is activated for the application, and verifying the state of the parameter, the events being systematically transmitted between the communication interface and the application if the parameter indicates that the access control to the communication interface is not activated.

According to one embodiment, the method includes steps of storing authorization and/or refusal rules of the use of the communication interface, storing verification states of rules, and of updating verification states of rules as a function of each event.

According to one embodiment, the other communication interface is of the contact or contactless type.

Embodiments also relate to an integrated circuit including a communication interface and a microcircuit configured to implement the method as defined above.

According to one embodiment, the integrated circuit includes a contact communication interface and a contactless communication interface.

According to one embodiment, the integrated circuit includes an application layer gathering at least one application installed in the integrated circuit, and an access control layer intercepting events transmitted between the application layer and the communication interface, and transmitting an intercepted event if a specific parameter of an application destination of the event or having emitted the event indicates that the application is authorized to use the communication interface.

Embodiments also relate to an integrated circuit card, including an integrated circuit such as that previously described.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
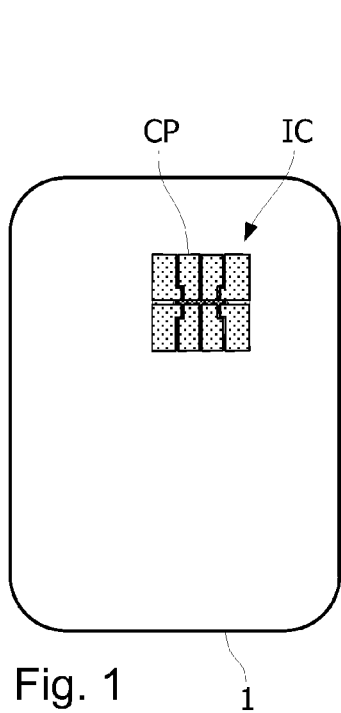
FIG. 1 schematically shows an integrated circuit card.

FIG. 1 shows an integrated circuit card 1 with an integrated circuit IC having a double communication interface including a contact interface and a contactless interface, the contact interface being connected to contact pads CP.

Figure 2:
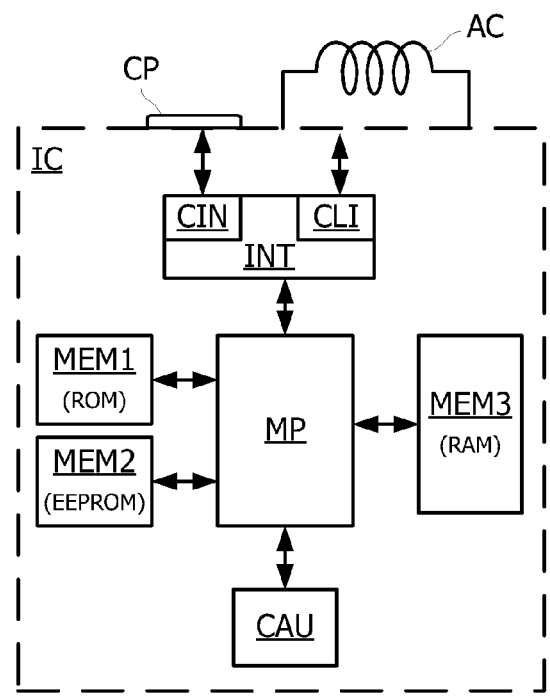
FIG. 2 schematically shows the integrated circuit of the integrated circuit card, including a double communication interface, contact and contactless.

FIG. 2 shows the integrated circuit IC connected to the contact pads CP and to an antenna circuit AC. The integrated circuit IC includes a processor MP, for example of the microprocessor or microcontroller type, a communication interface circuit INT, and memories MEM1, MEM2, MEM3, of which one is a volatile memory MEM3 and the others are non-volatile memories MEM1, MEM2. The non-volatile memories MEM1, MEM2 may be of the read only memory (ROM) and rewritable (EEPROM or Flash) types respectively. The interface circuit INT includes a contact communication interface circuit CIN connected to the contact pads CP and a contactless communication interface circuit CLI connected to the antenna circuit AC. The circuit INT ensures, in particular, the modulation and demodulation of data transmitted between the processor MP and the antenna circuit AC or the contact pads CP. In general, the integrated circuit may include cryptographic calculation circuits CAU. The cryptographic functions performed by the circuit CAU may also be done not by a specialized circuit, but directly by the processor MP. The contact pads CP and the interface CIN are, for example, in conformance with the ISO 7816 standard. The antenna circuit AC and the interface CLI are, for example, of the RFID HF or UHF types or in conformance with the ISO 14443 or ISO 15693 standards. The interfaces CIN and CLI each include, for example, a communication port of the Universal Asynchronous Receiving Transmitting (UART) type.

Figure 3:
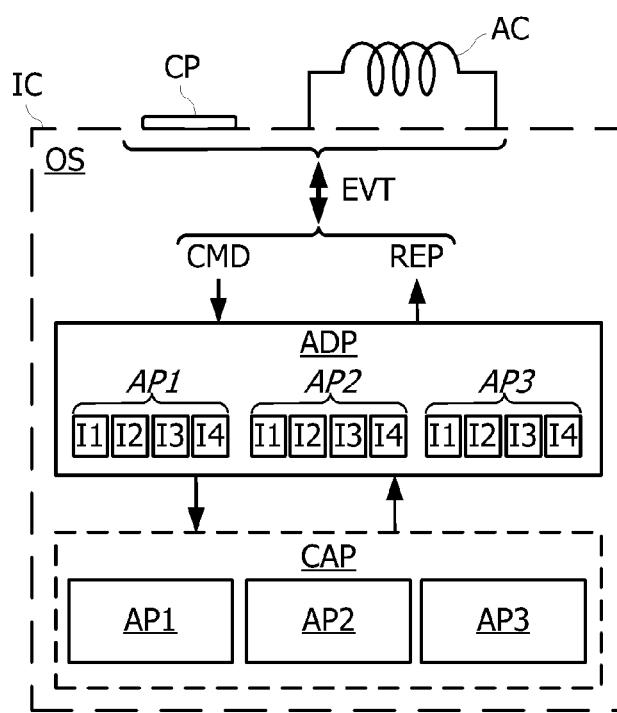
FIG. 3 shows different software layers implemented by the integrated circuit, according to one embodiment.

FIG. 3 shows programs installed in the non-volatile memories MEM1, MEM2 and executed by the processor MP. The installed programs include an operating system OS, and an application layer CAP that exchanges events EVT with the interface circuit INT. The events include commands CMD transmitted by the circuit INT to the layer CAP, and responses REP to these events transmitted by the application layer CAP to the circuit INT. The application layer CAP includes one or more applications AP1, AP2, AP3 installed in the circuit IC. For each event coming from a communication interface, the operating system OS indicates by which interface CLI or CIN the event was received.

According to one embodiment, the programs installed in the integrated circuit include an access control layer ADP to control the access to the contactless communication interface CLI. The control layer ADP is configured to intercept the events EVT coming from the interface circuit INT and to transmit them towards a destination application if this latter is authorized to use the interface by which the event was received. The layer ADP manages parameters I1, I2, I3 and I4 for each application AP1-AP3 installed in the circuit IC. The parameter I1 indicates whether or not the application should use the control layer ADP to receive and emit an event. That is to say, if the control of the access to a communication interface, for example the contactless interface CLI, is activated or not for the application. The parameter I2 indicates whether or not the application is authorized to use the communication interface of which the access is controlled, here the contactless interface CLI. One or more parameters I3 may be used to specify rules pertaining to events linked to a transaction coming from the interface circuit INT or from the application, each parameter I3 indicating an event intervening in a rule. Events may also be considered as: the reception by the interface circuit INT of a command destined to the application or able to be interpreted by the application, and the emission by the application of a message that may be a response to a command received by the application. The rules are applicable when the parameter I2 indicates that the application is not authorized to use the interface CLI. The optional parameter I4 specifies whether or not the application is authorized to access the interface CLI when certain specific application rules have been fulfilled. If the parameter I4 is not defined, the application is authorized to access the interface CLI provided that certain rules defined for the application are fulfilled.

A rule is defined by a logic combination causing the intervention of one or more of the previously-described events and/or one or more other rules. In addition, each rule may be associated with a parameter indicating whether the rule is sufficient, that is to say whether the fulfillment of the rule alone authorizes the application to access the interface CLI, or if one or more other rules must be fulfilled in order to authorize the application to access the interface CLI. This arrangement allows to simplify the definition of more complex rules that depend on the fulfillment of other rules specified as insufficient. This arrangement also allows for the specification of a sequence of events that should happen in order to authorize the application to access the interface CLI.

For example, the following events may be used to define rules for an application AP1-AP3:

I3-1: selection of the application,

I3-2: Get Processing Option (GPO) executed successfully by the application: positive response received from the application following a transaction initiation command GPO received from the interface INT, I3-3: VERIFY PIN executed successfully by the application: positive response received from the application following a code PIN verification command received from the interface INT, and I3-4: EXTERNAL AUTH. executed successfully by the application: positive response received from the application following an online authentication command received from the interface INT.

The following rules may be defined:

Rule 1 (insufficient): GPO executed successfully (I3-2=1),

Rule 2 (insufficient): VERIFY PIN executed successfully (I3-3=1),

Rule 3 (insufficient): EXTERNAL AUTH. executed successfully (I3-4=1),

Rule 4 (insufficient): Selection of the application (I3-1=1) AND Rule 1,

Rule 5 (sufficient): Rule 4 AND (Rule 2 OR Rule 3).

Each rule is equally associated with a state that stores whether or not it was fulfilled.

In practice, a table may be defined that associates to each of parameters I3 an event, an instruction code, and a return code (success or failure) that is initialized at "failure" and passes to the "success" state once the event happens. For example, the parameters I3 are defined by hexadecimal codes in the table 1 as follows:

TABLE 1

| Event | | Instruction Code | Return Code |
|---|---|---|---|
| I3-1 | Selection application | 01 | Failure |
| I3-2 | GPO | 02 | Failure |
| I3-3 | VERIFY PIN | 03 | Failure |
| I3-4 | EXTERNAL AUTH. | 04 | Failure |

Another table may be used to associate logic operator codes such as AND, OR, XOR, NOT, "(", and ")" to other codes not used by the parameters I3:

TABLE 2

| AND | OR | XOR | NOT | ( | ) |
|---|---|---|---|---|---|
| F1 | F2 | F3 | F4 | F5 | F6 |

The rule—Selection application AND GPO AND (VERIFY PIN OR EXTERNAL AUTH.)—may also be defined by the following series of hexadecimal codes:

01 F1 02 F1 F5 03 F2 04 F6

At the initialization of an application AP1-AP3, all of its parameters I1-I4 are initialized in the appropriate manner in order to be coherent between themselves and at a chosen activation state of the contactless interface CLI with respect to the application. Little by little as the transaction is performed with the application, the parameters I2, I3, I4 of the application may change states to reflect, in a coherent manner, the events that have occurred. During its execution, the application can change state and reach a certain state wherein it may be chosen to reinitialize one or more of the parameters I2, I3, I4 of the application or of the state of the rules. When the application receives or generates an event used in a rule, the application conserves the state of the event in a parameter I3 to be able to then evaluate whether or not the rule is fulfilled. If a rule changes state to go to unfulfilled, the application can simply decide to reinitialize the state of the rule that became unfulfilled or else to reinitialize the state of all the rules, in particular if this change of state can reveal a fraud attempt. If a rule changes state to go to fulfilled, the application verifies whether the rule is sufficient. If such is the case, the application may access the contactless interface CLI, except if the parameter I4 prevents this authorization. If so, it may be decided to initialize the state of each application rule.

Moreover, once an application uses the contact interface CIN, it may function normally and perform the additional processes linked to the activation/deactivation of the access to the interface CLI. If the parameter I1 indicates that the application uses the software layer ADP and if the parameter I2 of the application indicates that it is not authorized to use the interface CLI, the layer ADP refuses to select or to activate the application following an event coming from the interface CLI. This refusal may take the form of an absence of response on the part of the application or a particular return of an application control mechanism to an application manager. In this case, the application does not process the events coming from the interface CLI until a new attempt to use the application. In all other cases, the application functions normally without being affected by the control layer ADP. During the execution of the application, it may happen that the access to the interface CLI is no longer authorized. It may therefore be provided to update the parameters and the states of the application rules, to again authorize the access of the application to the interface CLI. In other words, the access to the interface CLI may be authorized and refused for an application as many times as necessary.

It is thus possible to block the use of the contactless interface CLI by a payment application in particular, until the card holder has been authenticated, for example offline, by the entry of a PIN code. Thus, it is not necessary to perform a first transaction online. The blocking of the access to the interface CLI for a payment application for example, does not necessarily lead to a refusal of access to this interface for other applications installed in the integrated circuit IC. Moreover, in contrast to the "New Card" functionality that implies a successful performance of a first transaction online, an application that is refused access to the interface CLI by the parameter I2 cannot perform any transactions by this interface. Thus, no transaction counter is modified for this application.

Figure 4:
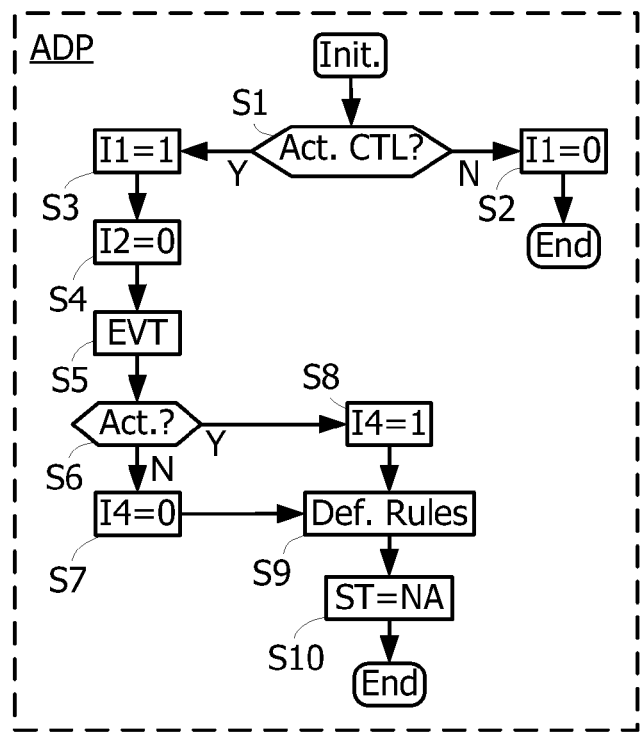
FIGS. 4, 5A, 5B, and 6 show processing sequences performed by the integrated circuit, according to one embodiment.

FIG. 4 shows a processing sequence executed by the processor MP during the installation of a particular application AP1-AP3. This sequence includes a step S1 where it is determined whether or not the control of the contactless interface CLI should or should not be activated for the application. If this control should not be activated, the sequence ends following a step S2 where the parameter I1 is set in an inactive state (for example at 0) indicating that the interface CLI access control is not activated for this application. In the opposite case, steps S3 to S6 are executed successively. At step S3, the parameter I1 of the application is set in an active state (for example at 1) indicating that the interface CLI access control is activated for the application. At step S4, the parameter I2 is set in a refusal state (for example at 0) indicating that the use by the application of the interface CLI is not authorized. At step S5, the events used in the rules are specified by parameters I3 of the application. At step S6, if the interface CLI access by the application is authorized with the condition that certain rules must be fulfilled, steps S8 to S10 are performed, otherwise steps S7, S9, and S10 are performed. At step S7, the parameter I4 is set in a locked state (for example at 0) indicating that the application cannot access the interface CLI even if certain rules are fulfilled. At step S8, the parameter I4 is set in an unlocked state (for example at 1) indicating that the application can have access to the interface CLI if some rules are fulfilled. At step S9, rules are defined that must be fulfilled in order to bypass an interface CLI access refusal. At step S10, the execution state of each rule defined at step S9 is initialized at unfulfilled. It should be noted that following step S7, rules may be defined and initialized even if the parameter I4 is in the locked state indicating that the refusal to use the interface CLI cannot be bypassed if some rules are fulfilled, because the parameter I4 can change state following the arrival of particular events.

Figure 5A:
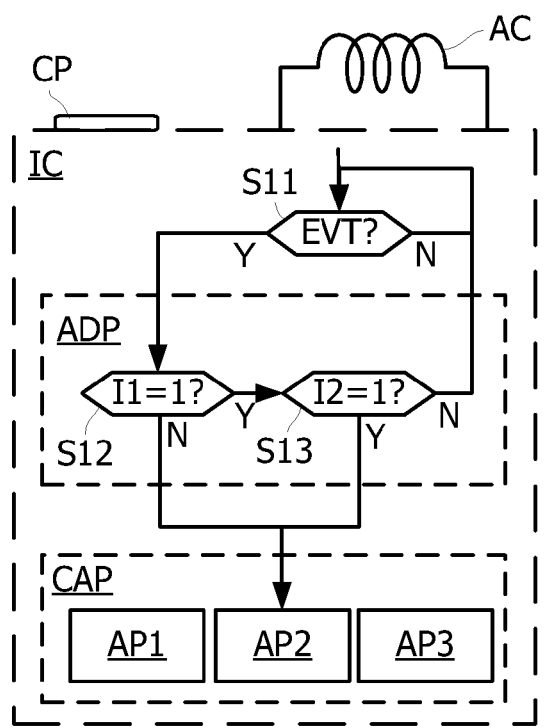
Figure 5B:
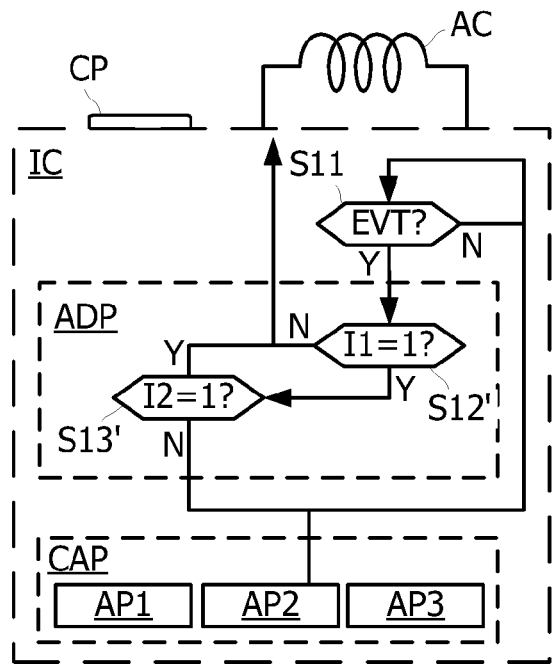

FIGS. 5A and 5B show sequences of steps performed following the activation of the integrated circuit IC by the contactless interface CLI. The sequence of steps of FIG. 5A is performed following the reception by the interface CLI of an event destined for one of the applications AP1-AP3. The sequence of steps of FIG. 5B is performed following the emission of an event by one of the applications AP1-AP3.

In FIG. 5A, the sequence includes steps S11 to S13, steps S12 and S13 belonging to the control layer ADP. At step S11, the processor MP is waiting for an event coming from the contactless interface CLI for an application AP1-AP3 or coming from an application. Upon the arrival of an event by the interface CLI for the application AP2 for example, the processor MP performs step S12. At step S12, if the parameter I1 indicates that the contactless interface CLI access control is activated for the destination application AP2 of the event (parameter I1 in the active state), step S13 is performed, otherwise the received event is transmitted to the application AP2 to be processed. At step S13, if the use of the interface CLI is authorized (parameter I2 in an authorization state) for the application AP2, the received event is transmitted to the destination application AP2 to be processed. Otherwise, the event is not transmitted to the application, and the processor MP waits for a new event at step S11.

In FIG. 5B, the sequence includes step S11, as well as steps S12' and S13' which belong to the control layer ADP. At step S11, upon the arrival of an event coming from an application, for example from the application AP2, the processor MP performs step S12'. At step S12', if the parameter I1 of the application indicates that the contactless interface CLI access control is activated for the application AP2 emitting the event (parameter I1 of the application AP2 in the active state), step S13' is performed. Otherwise the received event is transmitted to the interface CLI to be sent. At step S13', if the use of the interface CLI is authorized (parameter I2 of the application AP2 in the authorization state), the received event is transmitted to the interface CLI to be sent, otherwise the event is not transmitted and the microprocessor MP waits for a new event at step S11. In the case of a chip card in particular, it may be provided that the absence of a response from the application due to an event filtering done by the layer ADP, the microprocessor MP emits any notification message so as to not lose the synchronization between the card and a card reader terminal. In addition, such a notification message allows to not inform the terminal, by the absence of response, that a filtering has been done.

Figure 6:
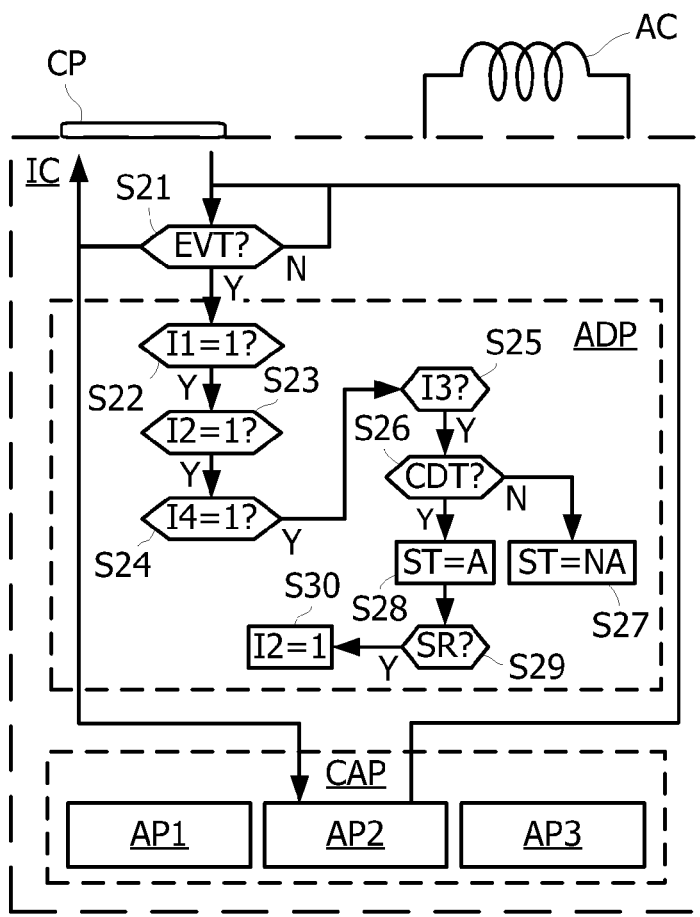

FIG. 6 shows a sequence of steps performed following the activation of the integrated circuit IC by the contact interface CIN. The sequence includes steps S21 to S31, steps S22 to S31 belonging to the control layer ADP. At step S21, the processor MP is waiting for an event coming from the contact interface CIN or from one of the applications AP1-AP3. Upon the arrival of an event from the interface CIN, it is transmitted to its destination; that is, one of the destination applications AP1-AP3 of the event. Simultaneously, the processor MP performs step S22. At step S22, if the parameter I1 indicates that the contactless interface CLI access control is activated for the recipient or issuing application of the event (I1 at the active state), for example the application AP2, step S23 is performed. Otherwise, the execution of the sequence is finished. Steps S23 to S30 allow to determine whether the parameter I2 of the application AP2 can go from the refused state to the authorized state (for example from 0 to 1), and if such is the case, to put it in the authorized state, otherwise the execution of the sequence is finished. At step S23, if the use of the interface CLI is not authorized (parameter I2 in the unauthorized state) for the application AP2, the processor MP performs step S24. At step S24, if the parameter I4 of the application AP2 is not defined or is in the unlocked state (for example at 1) indicating that the refusal specified by the parameter I2 (in the refused state) can be bypassed as long as a sufficient rule is fulfilled, the processor MP performs step S25. At step S25, if the last event arrived for the application corresponds to an expected event as specified by one of the parameters I3, the processor performs step S26. At step S26, if the arrived event does not cause a change of state of a rule, step S27 is performed. Otherwise, steps S28 and S29 are performed. At step S27, if it is considered that the event reveals an error or a fraud attempt, the states of all the rules stored for the application AP2 may therefore be initialized at the state unfulfilled. At step S28, the state of the rule is set to fulfilled. At step S29, if the fulfilled rule is sufficient, step S30 is performed. At step S30, the parameter I2 of the application AP2 is set in the authorized state (for example 1) to remove the refusal for the application AP2 to use the contactless interface CLI.

In this manner, the use of the contactless interface CLI by an application AP1-AP3 may be blocked beforehand, preventing any transaction by this interface, such that a potential transaction counter remains in its initial state. This use may then be unlocked by a successful transaction done by the contact interface CIN. The interface CLI can therefore be used to perform a later transaction with the application if the contactless interface CLI control is activated (I1 in the activated state) for the application and if the parameter I2 of the application indicates that the use of the interface CLI is authorized (I2 in the authorized state). If the state of the parameter I2 is not locked by the parameter I4 (I4 in the unlocked state), the use of the interface CLI by the application can be authorized (set in the authorization state of the parameter I2) with the condition that rules specified by the parameters I3 are fulfilled. These arrangements allow for the issuance of a double-interface integrated circuit card of which the interface CLI is prohibited beforehand from being used (I1 at the active state, I2 at the refused state, I4 at the unlocked state) for example by a payment application, and the definition of a transaction performed by the contact interface CIN, allowing the use of the contactless interface CLI afterwards, if the transaction obeys one or more rules specified with the help of the parameters I3. The rules defined with the help of the parameters I3 may, for example, authorize the use of the interface CLI by an application in the case of a successful online transaction or an offline transaction with successful PIN code validation.

In the example of FIGS. 5A, 5B and 6, the use of the contactless interface CLI by an application AP1-AP3 can only be unblocked by a transaction successfully performed with the application by the intermediary of the contact interface CIN. Nevertheless, a specific application executable by the interface CLI of which the parameters I1 and I2 are initially at the active state and at the authorizing state, respectively, may be provided and which performs the sequence of steps of FIG. 6, to authorize the use of the interface CLI by another application of which the parameters I1 and I2 are initially in the active state and the refused state, respectively, if certain conditions (rules) are met by events emitted or destined for the specific application. This arrangement allows, in particular and thanks to the specific application, to verify the identity of the card holder (online or offline) for another sensitive application such as a payment application, without necessarily incrementing a transaction counter.

The parameters I1-I4 for an application may be stored in one of the non-volatile memories MEM1, MEM2. The indicator I1 may be stored in a modifiable memory (for example MEM2) or non-modifiable memroy (for example MEM1). The definition of rules may also be stored in the memory MEM2. On the other hand, the states of the rules are stored in the volatile memory MEM3.

It may be provided to allow for the definition of refusal rules to prohibit the use of a communication interface authorized beforehand for an application AP1-AP3. To this end, the rules defined for an application may be associated with a parameter indicating if the rule, when it is verified, causes the parameter I2 of the application to be set in the authorization or refusal state, authorizing or not the use of the communication interface by the application. Thanks to this arrangement, it may be specified that one or more events, revealing for example a fraudulent use of the integrated circuit card, causes the refusal for an application to use a communication interface.

Figure 7A:
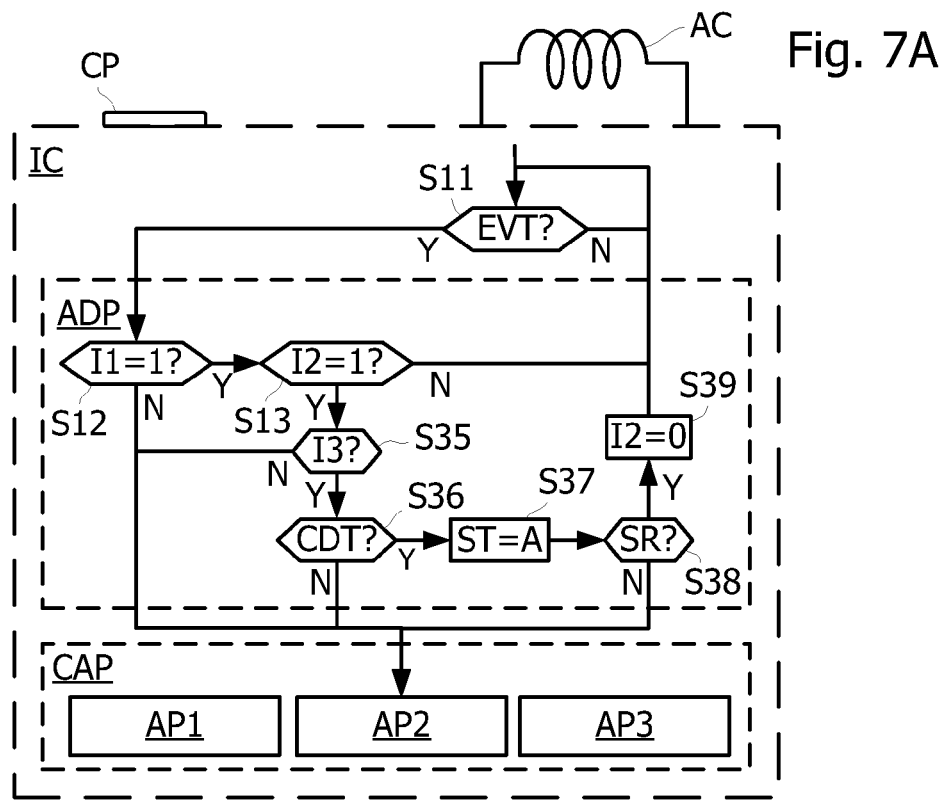
FIGS. 7A and 7B show processing sequences performed by the integrated circuit according to another embodiment.
Figure 7B:
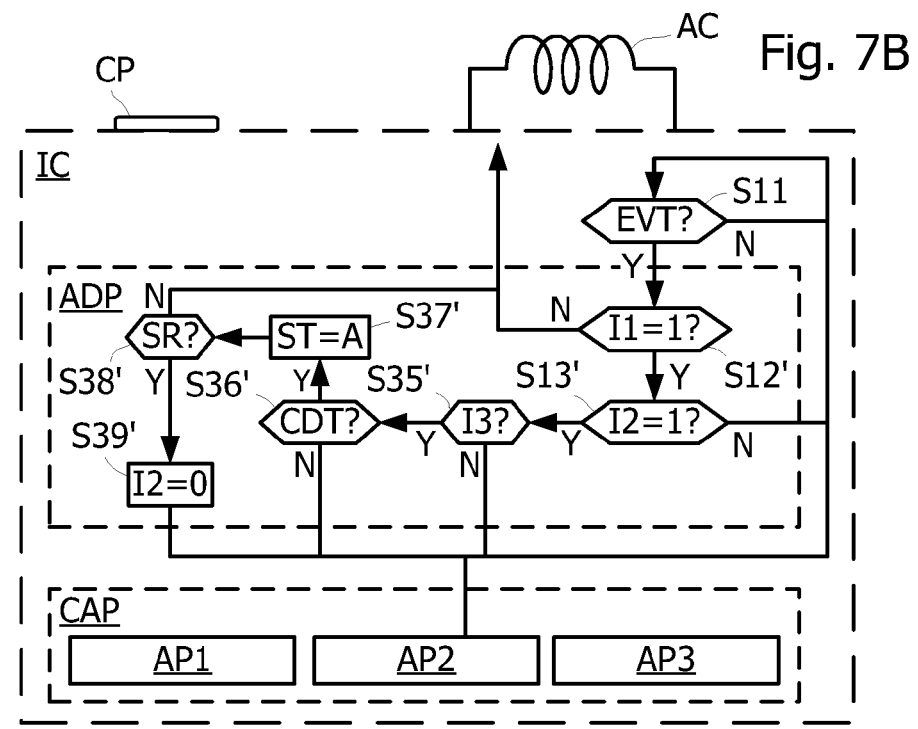

Thus, FIGS. 7A and 7B show sequences of steps executed following the activation of the integrated circuit IC by the contactless interface CLI. These sequences include steps of suppressing the authorization of the access to the interface CLI by an application. The sequence of steps of FIG. 7A is executed following the reception of an event by the contactless interface CLI for the one of the applications AP1-AP3. The sequence of steps of FIG. 7B is executed following the emission of an event by one of the applications AP1-AP3.

In FIG. 7A, the sequence includes steps S11 to S13, and supplementary steps S35 to S39 belonging to the control layer ADP. At step S11, the processor MP is waiting for an event coming from the contactless interface CLI to or from an application AP1-AP3. Upon the arrival of an event, for example for the application AP2, the processor MP performs step S12. At step S12, if the parameter I1 indicates that the contactless interface CLI access control is activated for the destination application AP2 of the event (parameter I1 in the active state), step S13 is performed, otherwise the received event is transmitted to the application AP2 to be processed. At step S13, if the use of the interface CLI is authorized (parameter I2 at the authorizing state) for the application AP2, step S35 is performed, otherwise the event is not transmitted to the application, and the processor MP waits for a new event at step S11. At step S35, if the last event arrived for the application corresponds to an expected event as specified by one of the parameters I3, the processor performs step S36. Otherwise, the received event is transmitted to the destination application AP2 to be processed. At step S36, if the arrived event causes a change of state of a rule, steps S37 and S38 are performed. Otherwise, the received event is transmitted to the destination application AP2. At step S37, the state of the fulfilled rule is set as fulfilled. At step S38, if the fulfilled rule is not sufficient, the received event is transmitted to the destination application AP2, otherwise step S39 is performed. At step S39, the parameter I2 is set in the refused state and the processor MP waits for a new event at step S11 without transmitting the event to the application.

In FIG. 7B, the sequence includes steps S11, S12' and S13', and steps S35' to S39' belonging to the control layer ADP. At step S11, upon the arrival of an event coming from the application, the processor MP performs step S12'. At step S12', if the parameter I1 indicates that the contactless interface CLI access control is activated for the emitting application of the event, step S13' is performed, otherwise the received event is transmitted to the interface CLI to be sent. At step S13', if the use of the interface CLI by the application AP2 is authorized (parameter I2 in the authorization state), steps S35' to S38' are performed, otherwise the processor MP waits for a new event at step S11 without sending the received event to the interface CLI. At step S35', if the last event arrived for the application corresponds to an expected event as specified by one of the parameters I3, the processor performs step S36', otherwise the received event is transmitted to the interface CLI to be sent. At step S36', if the arrived event causes a change of state of a rule, steps S37' and S38' are performed, otherwise the received event is transmitted to the interface CLI to be sent. At step S37', the state of the fulfilled rule is set as fulfilled. At step S38', if the fulfilled rule is not sufficient, the received event is transmitted to the interface CLI to be sent, otherwise step S39' is performed. At step S39', the parameter I2 is set in the refused state and the processor MP waits for a new event at step S11 without sending the event to the interface CLI.

The sequences of FIGS. 7A and 7B thus allow for the prevention of use of the interface CLI for an application AP1-AP3 following the arrival of an event or a combination of events emitted by the application or the interface CLI. For a sensitive application, such as a payment application, it is thus possible to define conditions of access authorization and refusal to a communication interface.

Similarly, rules may be defined for changing the state of parameter I4 of an application if these rules are fulfilled. It may also be provided to manage parameters I1-I4 and the state of rules not only for each application, but also for each communication interface of the integrated circuit IC. Thus, an application can modify its authorization to access a communication interface if a transaction was successfully done by another communication interface of which the access was authorized beforehand.

It will clearly appear to the skilled person that the present invention is susceptible of various embodiments and applications. In particular, the invention is not limited to a card with a microprocessor, but also applies to any portable support (for example a dongle, a USB flash drive, a portable computer, or the like) integrating a microcircuit capable of implementing the method previously described. The invention is also not limited to a double-interface card, but may be implemented in a card with a single interface or including more than two communication interfaces. The invention also applies to any type of communication interface with or without contact, such as those in conformance with the standards Bluetooth, WiFi, etc.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of access control to a communication interface of an integrated circuit, the method comprising:
    installing applications in said integrated circuit,
    intercepting events intended to be transmitted between a first communication interface of the integrated circuit and the installed applications, each intercepted event coming from the first communication interface being intended for transmission to only one of the installed applications,
    transmitting a first intercepted event intercepted between the first communication interface and a first application of the installed applications only if a first state parameter specific to the first application has a value indicating that the first application is authorized to use the first communication interface, the first event being intended for transmission between the first communication interface and the first application, and
    updating the first state parameter specific to the first application as a function of a second event of the intercepted events, the second event being intended for transmission between the first communication interface and a second application of the installed applications, the second application being distinct from the first application.

2. The method according to claim 1, further comprising updating the first state parameter specific to the first application as a function of third events of the intercepted events, the third events being intended for transmission between the first application and a second communication interface of the integrated circuit, the second communication interface being distinct from the first communication interface.

3. The method according to claim, wherein the first communication interface is of a contactless type.

4. The method according to claim 1, further comprising updating the first state parameter specific to the first application as a function of fourth events of the intercepted events, the fourth events being intended for transmission between the second application and a second communication interface of the integrated circuit, the second communication interface being distinct from the first communication interface.

5. The method according to claim 1, further comprising updating the first state parameter specific to the first application as a function of fifth events of the intercepted events, the fifth events being intended for transmission between the first application and the first communication interface.

6. The method according to claim 1, further comprising verifying that a condition is fulfilled by the intercepted events if the first state parameter specific to the first application indicates that the first application is not authorized to use the first communication interface, and if the condition is fulfilled, transmitting the intercepted events intended to be between the first communication interface and the first application and setting the first state parameter specific to the first application to a value indicating that the first application is authorized to use the first communication interface.

7. The method according to claim 6, wherein the setting of the first state parameter specific to the first application to a value indicating that the first application is authorized to use the first communication interface is performed only if authorized by a second state parameter specific to the first application.

8. The method according to claim 1, further comprising verifying whether a condition is fulfilled by the intercepted events if the first state parameter specific to the first application indicates that the first application is authorized to use the first communication interface, and if the condition is fulfilled, the intercepted events intended to be transmitted between the first communication interface and the first application are not being transmitted and the first state parameter specific to the first application is set to a value indicating that the first application is no longer authorized to use the first communication interface.

9. The method according to claim 1, further comprising storing for the first application a second state parameter specific to the first application and specifying whether the access control to the first communication interface is activated for the first application, and verifying the state of the second state parameter each time that an event is intercepted between the first application and the first communication interface, the intercepted events being systematically transmitted between the first communication interface and the first application if the second state parameter indicates that the access control to the communication interface is not activated.

10. The method according to claim 1, further comprising storing authorization and/or refusal rules of use of the first communication interface for each of the installed applications, storing verification states of rules, and updating verification states of rules as a function of the intercepted events intended to be transmitted between the installed applications and the first communication interface or a second communication interface of the integrated circuit.

11. The method according to claim 1, wherein the second communication interface is of the contact or contactless type.

12. An integrated circuit comprising a first communication interface, and a microcircuit connected to the first communication interface and comprising installed applications, the microcircuit being configured to:
    intercept events intended to be transmitted between the first communication interface and the installed applications, each intercepted event coming from the first communication interface being intended for transmission to only one of the installed applications,
    transmit a first event intercepted between the first communication interface and a first application of the installed applications only if a first state parameter specific to the first application has a value indicating that the first application is authorized to use the first communication interface, the first event being intended for transmission between the first communication interface and the first application, and
    update the first state parameter specific to the first application as a function of a second event of the intercepted events, the second event being intended for transmission between the first communication interface and a second application of the installed applications, the second application being distinct from the first application.

13. The integrated circuit according to claim 12, wherein the first communication interface comprises a contactless communication interface.

14. The integrated circuit according to claim 12, further comprising an application layer comprising the installed applications, and an access control layer configured to intercept events transmitted between the application layer and the first communication interface, store for each of the installed applications the first state parameter specific to the application and indicating whether the application is authorized to use the first communication interface, and transmit an intercepted event for one of the installed applications only if the first state parameter specific to said one of the installed applications indicates that said one of the installed applications is authorized to use the first communication interface.

15. An integrated circuit card comprising an integrated circuit according to claim 12.

16. The integrated circuit according to claim 12, further comprising a second communication interface connected to the microcircuit, wherein the microcircuit is further configured to update the first state parameter specific to the first application as a function of third events of the intercepted events, the third events being intended for transmission between the first application and the second communication interface.

17. The integrated circuit according to claim 16, wherein the second communication interface is of the contact or contactless type.

18. The integrated circuit according to claim 12, further comprising a second communication interface connected to the microcircuit, wherein the microcircuit is further configured to update the first state parameter specific to the first application as a function of fourth events of the intercepted events, the fourth events being intended for transmission between a second application of the installed applications and the second communication interface.

19. The integrated circuit according to claim 12, wherein the microcircuit is further configured to update the first state parameter specific to the first application as a function of fifth events of the intercepted events, the fifth events being intended for transmission between the first application and the first communication interface.

20. The integrated circuit according to claim 12, wherein the microcircuit is further configured to verify whether a condition is fulfilled by the intercepted events if the first state parameter specific to the first application indicates that the first application is not authorized to use the first communication interface, and if the condition is fulfilled, transmit the intercepted events intended for transmission between the first communication interface and the first application and set the first state parameter specific to the first application to a value indicating that the first application is authorized to use the first communication interface.

21. The integrated circuit according to claim 20, wherein the microcircuit is further configured to set the first specific state parameter of the first application to a value indicating that the first application is authorized to use the first communication interface, only if authorized by a second state parameter specific to the first application.

22. The integrated circuit according to claim 12, wherein the microcircuit is further configured to verify whether a condition is fulfilled the intercepted events if the first state parameter specific to the first application indicates that the first application is authorized to use the first communication interface, and if the condition is fulfilled, not transmit the intercepted events intended for transmission between the first communication interface and the first application and set the first state parameter specific to the first application to a value indicating that the first application is no longer authorized to use the first communication interface.

23. The integrated circuit according to claim 12, wherein the microcircuit is further configured to store for the first application a second state parameter specific to the first application and specifying whether the access control to the first communication interface is activated for the first application, and verify the state of the second state parameter each time that an event is intercepted between the first application and the first communication interface, and systematically transmit the event intercepted between the first communication interface and the first application if the second state parameter indicates that the access control to the communication interface is not activated.

24. The integrated circuit according to claim 12, wherein the microcircuit is further configured to store authorization and/or refusal rules of use of the first communication interface by each of applications installed in the microcircuit, store verification states of rules, and update verification states of rules as a function of each of intercepted events to be transmitted between one of the applications and the first communication interface or a second communication interface of the integrated circuit.

* * * * *